United States Patent [19]
Zimmerman

[11] 3,882,944
[45] May 13, 1975

[54] DOZER DRAG-BEAM
[76] Inventor: Donald Zimmerman, P.O. Box X, Arma, Kans. 66712
[22] Filed: Nov. 12, 1973
[21] Appl. No.: 414,896

[52] U.S. Cl. .................................. 172/199; 172/801
[51] Int. Cl. ............................................. A01b 49/02
[58] Field of Search ............ 172/199, 200, 801, 802, 172/276, 197, 803–809

[56] References Cited
UNITED STATES PATENTS
| 214,667 | 4/1879 | Keller | 172/200 |
| 2,774,155 | 12/1956 | Hipp | 172/801 X |
| 2,986,828 | 6/1961 | Lapins et al. | 172/197 |
| 3,692,120 | 9/1972 | Cline | 170/200 X |

*Primary Examiner*—Stephen C. Pellegrino
*Attorney, Agent, or Firm*—John H. Widdowson

[57] ABSTRACT

A drag-beam for an earthworking blade is mountable on a rear side portion of the blade. The beam is pivotal about the blade and extends from opposite ends of the blade.

4 Claims, 5 Drawing Figures

DOZER DRAG-BEAM

BACKGROUND OF THE INVENTION

The invention is related to drag-beams or leveling drags for earthworking blade structures. Many types of earthworking devices and earthworking blades are known in the prior art. Some of which devices are provided with integral leveler plates or drags which run on the ground substantially behind the earthworking portion of the implement to limit or regulate the depth of cut. Generally, these prior art devices include a plate-like member substantially spaced behind the cutting blade or blades of the earthworking device which is supported from the structure that mounts the earthworking blade or blades on the vehicle. Some of these prior art leveling devices are adjustable in their horizontal position relative to the cutting edge of the earthworking blade or blades. All of the known prior art devices are limited in their transverse size to be no greater than the width of the earthworking devices cutting blade or span of the cutting blades. None of the prior art devices are particularly well suited for use with earthworking blades of the type normally mounted with bulldozers or crawler type tractors. Of the earthworking blade structures known in the prior art to have an attached drag member or the like, such generally consists of a rigidly mounted plate-like member attached to the rear of the earthworking blade structure to somewhat regulate the depth of cut of the earthworking blade. No drag structure is known in the prior art which is pivotally mountable with the rear of a bulldozer blade and extends from opposite ends of the blade.

SUMMARY OF THE INVENTION

In a preferred specific embodiment, a drag-beam means for an earthworking blade includes a mount on the rear side portion of an earthworking blade structure and a beam member pivotally supported by the mount extending transversely parallel to the earth-working blade. The mount includes a first mount portion rigidly secured to the rear side portion of the earthworking blade and a second portion rigidly secured to the beam member and pivotally mountable with the first portion. The drag-beam means includes a pair of mounts on opposite end portions of the earth-working blade structure which allow the beam to pivot between a hanging position when the earthworking blade structure is raised and a cutting position when the cutting edge portion of the earth-working blade is in cutting position on a ground surface. In cutting position, the leading edge portion of the beam is horizontally disposed above the trailing edge portion of the beam.

One object of this invention is to provide a dozer drag-beam structure overcoming the aforementioned disadvantages of the prior art devices.

Another object of this invention is to provide a drag-beam structure for a dozer blade of the type used with bulldozer type crawler tractors which is removably mountable on a rear side portion of the earthworking blade structure.

Still, one other object of this invention is to provide a dozer drag-beam structure which is removably mountable with a rear side portion of a bulldozer type earthworking blade structure with the beam extending substantially from the opposite ends of the blade structure which in use in the clearing and leveling of land will cause the earthworking blade to have a floating effect on the blade so it will not form washboards or gouge into the ground.

Still, another object of this invention is to provide a dozer drag-beam structure which has an elongated beam of a generally rectangular cross-section which is mountable behind the earth-working blade structure of a bulldozer or crawler type tractor in a pivotal relation so that it will pivot slightly to a hanging position when the blade is raised above ground level and which will pivot to a dragging position with its leading edge above its trailing edge when the blade structure is in cutting position on the ground.

Various other objects, advantages and features of the invention will become apparent to those skilled in the art from the following discussion, taken in conjunction with the accompanying drawings, in which:

Figure 1:
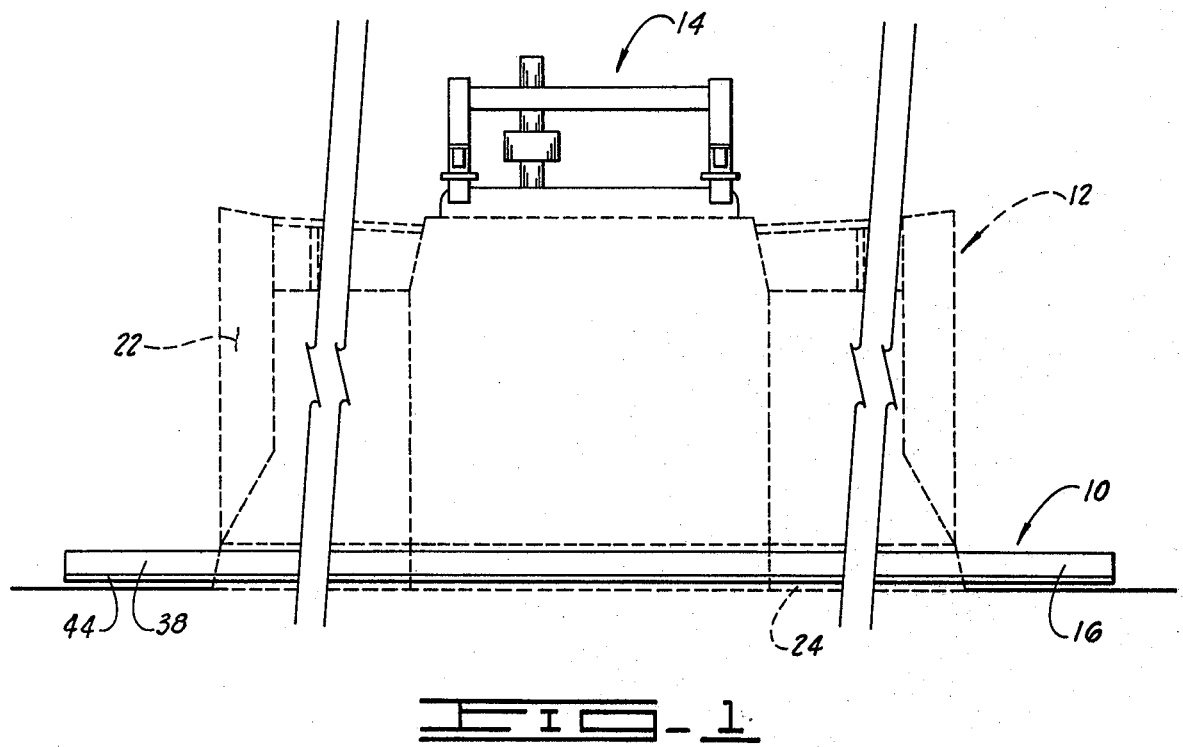
FIG. 1 is a transversely shortened front end elevation view of a bulldozer having the drag-beam mounted with the earthworking blade structure, with the blade structure shown in dotted lines for clarity.

The following is a discussion and description of preferred specific embodiments of the dozer drag-beam structure of this invention such being made with reference to the drawings, whereupon the same reference numerals are used to indicate the same or similar parts and/or structures. It is to be understood that such discussion and description is not to unduly limit the scope of the invention.

DESCRIPTION OF PREFERRED EMBODIMENTS

Figure 2:
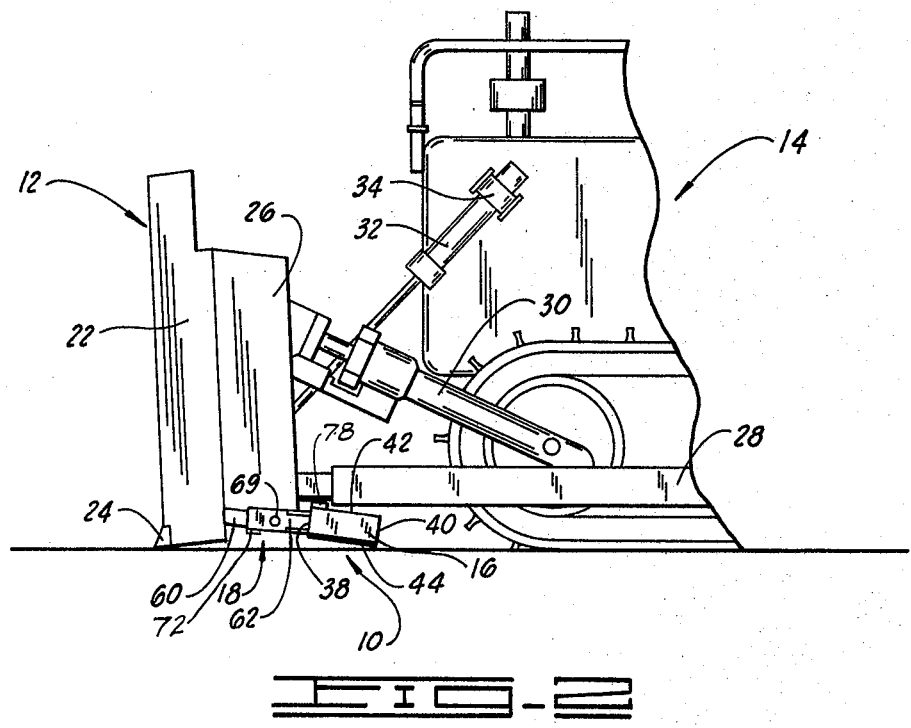
FIG. 2 is a side elevation view of the forward portion of the bulldozer tractor shown in FIG. 1 with the cutting edge of the earthworking blade on the ground in cutting position.

Referring to the drawings in detail and in particular to FIGS. 1 and 2, the dozer drag-beam structure of this invention, indicated generally at 10, is shown mounted with the earthworking blade structure 12 of a bulldozer or crawler type tractor 14. The dozer drag-beam structure includes the beam member 16 and mounts therefor, which are indicated generally at 18.

Figure 3:
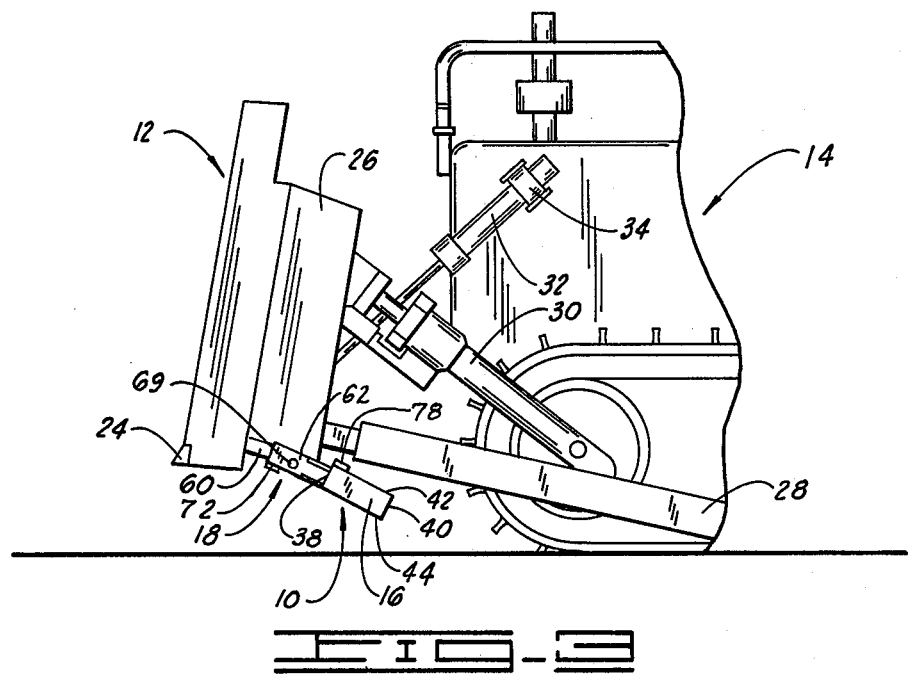
FIG. 3 is a side elevation view of the forward portion of the bulldozer shown in FIG. 1 with the earthworking blade structure in a raised position above the ground and the drag-beam in its pivoted hanging position.

The earthworking blade structure 12 includes a moldboard 22 with a cutting edge portion 24 on its lower forward edge and a supporting structure 26 secured to its rear side. Both sides of the bulldozer are the same with a blade support beam 28 pivotally mounted on one end with the bulldozer or tractor 14 and on its other end pivotally mounted with the supporting structure 26. A tilt cylinder 30 is pivotally connected between the support beam 28 and the supporting structure 26. A lift cylinder 32 is supported by a pivotal mount 34 on an upper portion of the tractor structure and is connected with the blade supporting structure 26 to raise and lower the earthworking blade 12 relative to the ground. The earthworking blade structure 12 is shown in FIGS. 1 and 2 in the cutting position and in FIG. 3 in a raised position.

Figure 4:
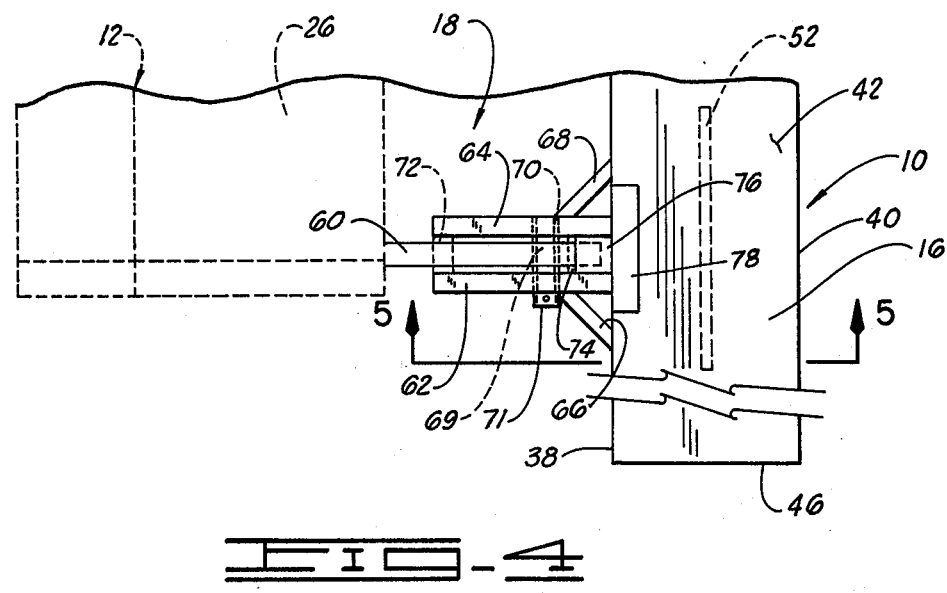
FIG. 4 is a top plan view of an outer end portion of the earthworking blade structure and the drag-beam showing a mount of the drag-beam, with the earthworking blade structure shown in dashed lines for clarity.
Figure 5:
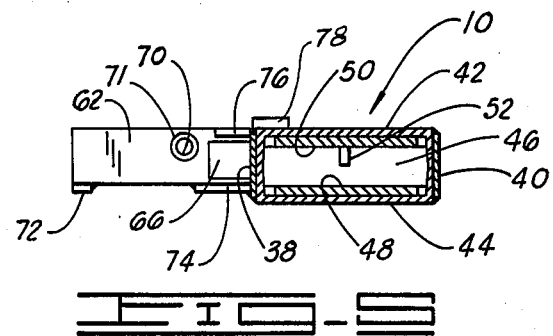
FIG. 5 is a sectional view of the drag-beam alone taken on line 5—5 of FIG. 4.

The dozer drag-beam 10 is an elongated and cross-sectionally rectangular structure attached to the rear side portion of the earthworking blade structure on a lower portion thereof. The beam is shown in detail in FIGS. 4 and 5 and in mounted relation with the bulldozer in FIGS. 1, 2 and 3. The beam alone is indicated at 16 and has a leading edge portion 38, a trailing edge portion 40, an upper portion 42 and a lower portion 44 and is a completely enclosed structure with ends 46. The interior structure of the beam is shown in FIG. 4 and includes an inner lower plate member 48 and an inner upper plate member 50 and a longitudinal stiffener 52 in the area of the mounts 18. Preferably, the beam has the several elements thereof welded together. The upper and lower portions of the beam are channel members arranged in a box-like configuration and the leading edge 38 and trailing edge 40 having additional exterior strengthening edge members welded to the upper and lower channel members. The beam is preferably constructed approximately 20 to 30 feet in length, 3 to 9 inches in thickness and 15 to 20 inches in width. In practice this range of sizes for the beam 16 has been found to be the most useful. Of course, the specific size of the beam must be proportioned to the weight and horsepower of the tractor on which it is to be used. It is to be noted that elements of the beam member itself 16 can be varied by using suitable equivalents to achieve the preferred generally rectangular beam structure.

A pair of mounts 18 are provided, one on each end portion of the drag-beam for mounting the beam with the earthworking blade structure 12. The mounts includes a first mount portion secured to a rear side portion of the earthworking blade structure 12 and a second mount portion rigidly secured to the beam 16 and pivotally connectable with the first mount portion. The second mount portion has stops to limit pivotal movement of the beam relative to the earthworking blade structure 12. The first mount portion has a lug member 60 secured to the rear side portion of the moldboard supporting structure 26 and extending rearward therefrom with an aperture transversely through its rearwardmost end portion. The lug 60 is preferably welded to the supporting structure 26. The second mount portion is a clevis-like structure having elongated plate members 62 and 64 extending rearward from the trailing edge 38 of the beam 16 with brace members 66 and 68 secured to the beams trailing edge 38 and the clevis members 62 and 64, respectively. An aperture 70 extends through clevis members or sides 62 and 64 as shown in FIG. 4 for the insertion of a mounting pin 69 for mounting the drag-beam 10 with the earthworking blade structure. A locking pin retaining collar 71 is secured to the outer clevis sides 62 to guide the mounting pin 69 and it is provided with an aperture for the insertion of another pin to hold or secure the mounting pin 69 in place in the aperture 70. A stop to limit downward pivotal movement of the beam is indicated at 72 on the forward portions of the lower portion of the clevis. Reinforcement gussets 74 and 76 below and above the rear of the clevis are welded between the clevis sides for strengthening. Preferably, the lug member 60 is sized slightly shorter in its height dimension in the interior of the clevis sides 62 and 64 so that the beam will pivot slightly about the locking pin 69. The stop 72 limits the pivotal movement of the beam to a slight variance which is distinguishable in comparing its position in FIG. 2 and FIG. 3. A shim 78 is welded to the top of the beam 16 adjacent to the clevis for contacting the lower surface of the blade support beam 28 or push beam to properly position the drag-beam in a cutting position. Obviously, dimensions of the shim will vary depending on the specific dimensions of the blade 12, the push beam 28 and the drag-beam member 16 to position the drag-beam as desired. When the earthworking blade 12 is on the ground as shown in FIG. 2 in a cutting position the drag-beam 10 is in a rigid position relative to the blade 12 and push beam 28 with the shim 78 contacting the push beam 28 positioning the drag-beam 10 so that the bottom of the leading edge thereof is approximately one-half inch higher than the bottom of the trailing edge and the bottom of the trailing edge is approximately ½ inch horizontally higher than the lowest edge portion of the blades cutting edge portion 24. With the bottom surface of the beam 19 being inclined when cutting the beam slides over the ground in a sled-like fashion.

The drag-beam 10 being removably mountable with the earthworking blade structure 12 is an important feature of the invention particularly in regard to transportion of the tractor and the beam from one locality to another. Since the beam mounts 18 attach the beam 10 to the earthworking blade structure 12 by the pins 69, this facilitates easy mounting and removing of the drag-beam 10. Attaching the drag-beam 10 is done by driving the mounting pins 69 into the mounts 18 through the aperture 70 and securing the mounting pins 69 in the locking collar 71 with locking clip pins, bolts or the like. Removal of the drag-beam 10 is accomplished by removing the locking pins and mounting pins 69. Inasmuch as the drag-beam is substantially longer than conventional bulldozers or similar tractors, it can be laid lengthwise on the bed of the trailer used for road transportation of the tractor and carried with the tractor or in the alternative it can be carried on a pole trailer or other trailer as desired.

In the use and operation of the dozer drag-beam 10 of this invention, it is mounted with the earthworking blade structure and functions with the blade. The lift cylinders 32 and tilt cylinders 30 for the blade are the only controls needed for operation of the earthworking blade 12 and the dozer drag-beam 10. When the tractor operator sets the earthworking blade 12 with the lift control to carry a light load, the drag-beam 10 will cause the blade 12 to have a semi-floating effect as the beam itself 16 slides along or over the ground in the above described position. When in use in this manner it has been found that the earthworking blade structure 12 will not gouge into the ground and form so-called washboards in the earth being worked. The lift cylinders 32 are used to keep the moldboard 22 level and the tilt cylinders 30 keep it upright. When filling a low spot in the terrain, the lift control is raised slightly. When making a cut, the lift control is lowered to allow the cutting edge 24 of the blade to further penetrate the ground with the drag-beam following in the described position and somewhat restraining the rate of the cut. When making a cut such as for drainage purposes or accumulating material for a fill, the earthworking blade 12 is limited in the amount which it will cut, thus it takes a longer distance to accumulate material in front of the blade. This limiting the amount cut has the overall effect of leaving the land smoother in the area where the material is removed. It is to be noted that the drag-beam 10 can be used for back dragging; that is, moving the tractor in the reverse direction with the trailing edge portion of beam dragging the ground. This method of back dragging with the bulldozer drag-beam 10 is advantageous for filling low areas without significant maneuvering of the tractor. Maneuvering of the tractor 14 with the drag-beam 10 mounted thereon is easily done by raising the earthworking blade structure 12 so that the drag-beam 10 clears the ground then turning the tractor 14 to whatever position desired. In turning the tractor, compensation must be made for the outer end portions of the beam 10 which extend outwardly past the ends of the moldboard 22. It is to be noted that operation of a crawler type tractor moving in the forward direction when cutting or smoothing land with the drag-beam 10 of this invention attached is somewhat smoother than could not be otherwise because the tracks of the tractor will always be running on smooth or substantially smooth land. In practice it has been found that this feature of the invention will permit the bulldozer or crawler type tractor to be operated in a higher gear or at a faster speed than can normally be done without the dozer drag-beam 10.

In the manufacture of the dozer drag-beam structure of this invention, it is obvious that the dozer drag-beam can be easily constructed to achieve the end product. The beam structure is simple in design and easily mountable with the moldboard supporting structure of an earthworking blade for a bulldozer type tractor or other earthworking blades of a similar character. The specific size of the dozer drag-beam can be varied depending upon the weight and horsepower of the tractor with which it is to be used so that optimum results are obtained.

In the use and operation of the dozer drag-beam structure of this invention, it is seen that same provides a blade attachment which functions as a drag-beam to regulate and control the cutting operations of the blade on which it is mounted. The dozer drag-beam of this invention prevents the formation of so-called washboards produced when making relatively shallow cuts for the smoothing of land. The dozer drag-beam does not impair the capability of the dozer blade for making significant or substantial cuts in the ground such as is required for the formation of ditches or cuts for drainage or accumulating material for a fill and when used for such purposes leaves the land in a smoother overall condition in the area where the material is removed. Additionally, the dozer beam of this invention can be used for back dragging by operating the tractor in a reverse direction. Additionally the dozer drag-beam enables a crawler type tractor to be operated at a faster speed than it can be operated without the dozer drag-beam which provides for increased efficiency in operation and reduction in operating costs.

As will become apparent from the foregoing description of the applicant's dozer drag-beam, relatively inexpensive and simple means have been provided to control the cut of an earthworking blade of a bulldozer type tractor or the like. The drag-beam structure is economical to manufacture due to its simple design and can be easily mounted with an earthworking blade structure for use. During times when it is necessary to transport the tractor on the road, the dozer drag-beam can be easily and quickly removed from the blade structure.

While the invention has been described in conjunction with preferred specific embodiments thereof, it will be understood that this description is intended to illustrate and not to limit the scope of the invention, which is defined by the following claims.

I claim:

1. A drag-beam means for an earthworking blade, comprising:
   a. an earthworking blade;
   b. a drag-beam having a leading edge portion and a trailing edge portion;
   c. mounting means on a rear side portion of said earthworking blade constructed and adapted to receive and mount said drag-beam, said mounting means having a first mounting portion secured to said rear side portion of said earthworking blade and having a second mounting portion pivotally mounted on said first mount portion,
   d. said mounting means has means to limit upward and downward pivotal motion of said drag-beam relative to said earthworking blade such that when said earthworking blade has its cutting edge portion in cutting position on a ground surface said beam trailing edge portion is disposed horizontally above said cutting edge portion and said beam leading edge portion is horizontally disposed above said beam trailing edge portion, and
   e. said drag-beam mounted on said second mounting portion, and extending substantially from opposite ends of said earthworking blade when mounted thereon.

2. The drag-beam means of claim 1, wherein:
   a. said first mounting portion has a lug member extending rearwardly from said earthworking blade,
   b. said second mounting portion has a clevis portion secured to said beam leading edge portion removably mountable with said lug member, and
   c. said means to limit pivotal motion has a first stop member on a lower portion of said second mounting portion to in use limit downward pivoting motion of said drag beam and a second stop member on an upper portion of said second mounting means to in use limit upward pivoting motion of said drag beam.

3. The drag-beam means of claim 2, wherein:
   a. said drag-beam has a generally rectangular transverse cross-section, and
   b. said first stop member is secured to a lower portion of said clevis portion and said second stop member is secured on an upper portion of said clevis portion.

4. The drag-beam means of claim 3, wherein said mounting means has a pair of said first mounting means and said second mounting means on opposite end portions of said earthworking blade and said drag-beam.

* * * * *